US008745503B2

(12) United States Patent
Jaquot et al.

(10) Patent No.: US 8,745,503 B2
(45) Date of Patent: Jun. 3, 2014

(54) GRAPHICAL INTERFACE FOR MANAGING SERVER ENVIRONMENT

(75) Inventors: Bryan J. Jaquot, Ft. Collins, CO (US); Kurt M. Olender, Ft. Collins, CO (US); Roy Johnson, Ft. Collins, CO (US); Michael Kingdom, Ft. Collins, CO (US); John Liddell Long, Ft. Collins, CO (US); Edgar Circenis, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 479 days.

(21) Appl. No.: 12/906,090

(22) Filed: Oct. 16, 2010

(65) Prior Publication Data

US 2011/0055711 A1 Mar. 3, 2011

Related U.S. Application Data

(62) Division of application No. 11/407,578, filed on Apr. 20, 2006, now abandoned.

(51) Int. Cl.
*G06F 3/01* (2006.01)

(52) U.S. Cl.
USPC .......................................... 715/736; 709/223

(58) Field of Classification Search
USPC ................... 715/734–738; 709/223, 224, 226
See application file for complete search history.

(56) References Cited

U.S. PATENT DOCUMENTS

| | | | |
|---|---|---|---|
| 6,108,759 A * | 8/2000 | Orcutt et al. .................. 711/173 |
| 6,330,555 B1 * | 12/2001 | Weber .................................... 1/1 |
| 6,393,485 B1 * | 5/2002 | Chao et al. .................... 709/231 |
| 6,912,569 B1 | 6/2005 | Sharma et al. |
| 7,107,534 B1 * | 9/2006 | de Jong et al. ................ 715/734 |
| 7,315,985 B1 * | 1/2008 | Gauvin et al. ................ 715/734 |
| 7,340,579 B2 * | 3/2008 | Baldwin et al. ............... 711/173 |
| 7,516,181 B1 * | 4/2009 | Du et al. ....................... 709/205 |
| 7,966,294 B1 * | 6/2011 | Gupta et al. .................. 707/654 |
| 2002/0024535 A1 * | 2/2002 | Ueno et al. .................... 345/736 |
| 2003/0009511 A1 * | 1/2003 | Giotta et al. .................. 709/201 |
| 2004/0003063 A1 * | 1/2004 | Ashok et al. .................. 709/221 |
| 2004/0172466 A1 * | 9/2004 | Douglas et al. ............... 709/224 |
| 2005/0021851 A1 * | 1/2005 | Hamynen ...................... 709/245 |
| 2005/0022185 A1 * | 1/2005 | Romero ......................... 718/100 |

(Continued)

OTHER PUBLICATIONS

Herington, Dan & Bryan Jaquot, "Working with nPartition Servers in the HP Virtual Server Environment", Addison Wesley Professional, Oct. 28, 2005, pp. 1-17.

(Continued)

*Primary Examiner* — Omar Abdul-Ali
*Assistant Examiner* — Anil Bhargava (57) ABSTRACT

A system includes a server environment and a management station. The server environment includes hardware servers. At least some of the servers can be characterized by a hierarchy of partitions. The management station provides an administrative interface. The administrative interface provides a display that displays alternate views of a graphical representation of the server environment. Each of the views has graphical partition elements corresponding to at least some of the partitions nested with graphic server elements corresponding to at least some of the hardware servers. At least some of the graphical partition elements include links that, when activated, cause the graphical representation to switch to another of its views in which is highlighted a graphical partition element that was not highlighted in the previous view.

14 Claims, 5 Drawing Sheets

(56) References Cited

U.S. PATENT DOCUMENTS

| | | | |
|---|---|---|---|
| 2005/0120160 A1* | 6/2005 | Plouffe et al. | 711/1 |
| 2006/0037016 A1* | 2/2006 | Saha et al. | 717/178 |
| 2006/0106999 A1* | 5/2006 | Baldwin et al. | 711/153 |
| 2007/0061441 A1* | 3/2007 | Landis et al. | 709/224 |
| 2007/0150492 A1* | 6/2007 | Shitomi | 707/100 |
| 2007/0180448 A1* | 8/2007 | Low et al. | 718/1 |
| 2009/0235265 A1* | 9/2009 | Dawson et al. | 718/104 |
| 2010/0161565 A1* | 6/2010 | Lee et al. | 707/674 |
| 2011/0022795 A1* | 1/2011 | Murase | 711/114 |

OTHER PUBLICATIONS

"HP Serviceguard solutions" Hewlett-Packard Development Company, Aug. 2005, pp. 1-8.

Piniatowski, Marty "Hewlett Packard Virftual Partitions Explained", Prentice Hall PTR, Apr. 5, 2002, pp. 1-33.

* cited by examiner

GRAPHICAL INTERFACE FOR MANAGING SERVER ENVIRONMENT

This is a divisional of U.S. patent application Ser. No. 11/407,578 filed 2006 Apr. 20 now abandoned.

BACKGROUND

Servers are computers that provide services to other computers. At a minimum, a server includes a data processor, memory, and input/output (I/O) devices. However, to respond effectively with services in demand, some severs include many instances of each. For convenient upgrading and repair, the multiple processors can be arranged in cells, e.g., physical modules with their own processor(s), memory, and I/O devices. To reduce downtime due to repair or upgrading, the cells can be grouped into hardware partitions, each of which can be repaired or upgraded without disturbing the functioning of the other hardware partitions.

To minimize downtime when a partition is repaired or upgraded, hardware partitions can be arranged in clusters, so that the functions of a partition being repaired or replaced can be transferred to another partition in the cluster, at least until the repair or upgrade is complete. Clusters can include partitions of different servers so that even if one server fails completely, a partition's functions can be continued by other partitions in the cluster. Hardware partitions can also be arranged in resource domains, which permit computing resources to be shifted among included hardware partitions.

Hardware partitions can be further divided into virtual partitions, each of which runs software independently of other virtual partitions in a hardware partition. However, the hardware on which that software runs cannot be changed without affecting the software on the virtual partition. Hardware and virtual partitions can be further divided into resource partitions. For example, one application program may be assigned to a first resource partition that is allotted 60% of the computing resources assigned to the incorporating virtual partition, while another application or process may be assigned to a second resource partition that is allocated 40% of the computing resources available to the incorporating virtual partitions. There are also virtual machines, which are basically software that allows one operating system to run on top of another operating system (instead of directly on hardware).

Each server entity, e.g., hard partition, virtual partition, cluster, etc., corresponds to a "technology" for which there is a dedicated management tool, e.g., a hard partition management tool, a virtual partition management tool, a cluster management tool, etc. Administrators dealing with complex systems employing multiple technologies often go beyond these tools to see how the technologies interact. For example, some administrators employ spreadsheets or other form of documentation to piece together the disparate technology elements of their system.

For an example of the peer-to-peer aspect of coordinating technologies, consider Serviceguard (available from Hewlett-Packard Company), which allows multiple servers to be joined together in a cluster to provide highly available applications. In this case, two hardware partitions can be joined in a cluster; for applications to be highly available, the partitions should be on different servers, preferably located remotely of each other so that it is not likely that a single cause of failure (e.g., a data-center power or cooling failure) would shut both partitions down.

BRIEF DESCRIPTION OF THE DRAWINGS

The following drawings are of embodiments/implementations of the invention and not of the invention itself.

DETAILED DESCRIPTION

Figure 1:
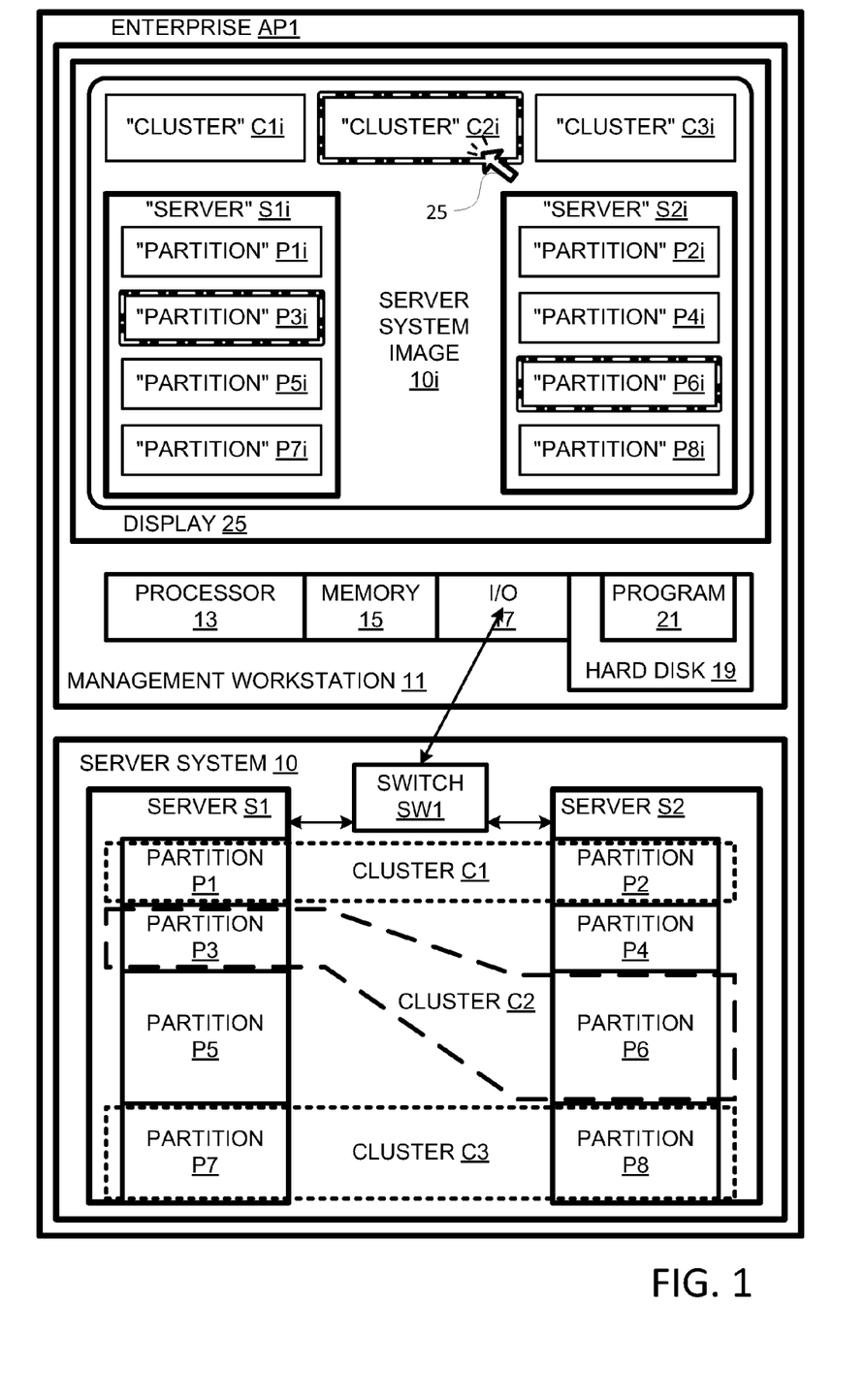
FIG. 1 shows an enterprise system that serves as one of many possible embodiments of the invention. In this figure, labels in quotes and references ending in "i" refer to image objects.

An enterprise computing system AP1 in accordance with the present invention includes a server environment 10 and a management workstation 11, as shown in FIG. 1. Server environment 10 includes two multi-processor servers S1 and S2 that communicate through a network switch SW1. Servers S1 and S2 are designed to provide services, e.g., database and accounting services, to workstation computers (not shown). Server 51 is divided into four hard partitions P1, P3, P5, and P7, while server S2 has been divided into four hard partitions P2, P4, P6, and P8. Other embodiments have different numbers of servers, and the servers can have any number of hard partitions; in fact, some servers are not partitioned, in which case they are treated as having one partition. Each hard partition includes one or more processors, memory, and I/O devices, as well as access to one or more hard disks.

Three high-availability clusters C1, C2, and C3 are defined for server environment 10. Cluster C1 includes partitions P1 and P2; cluster C2 includes partitions P3 and P6; and cluster C3 includes partitions P7 and P8. The partitions in a high-availability cluster serve as backup for each other in that, in the event a partition fails, its functions can be assumed by another partition in the cluster. Although clusters can include partitions from the same server, clusters C1-C3 include clusters from different servers so that if an entire server fails, its functions can continue. Some functions may not have provisions for failure; for example, in system 10, partitions P4 and P5 are not in clusters.

In enterprise environment AP1, servers S1 and S2 can be located in different cities so that, for example, a natural disaster causes server S1 to fail, server S2 is likely be remain operational. The invention also provides for clusters of co-located servers, and servers in different continents. The invention provides for more complex clustering arrangements involving any number of server and partitions.

Management workstation 11 includes a processor 13, memory 15, I/O devices 17, a hard disk 19, and a display 21, mice, trackballs, etc. In other embodiments, the management workstation can include multiple processors and related components. Also, in some embodiments, there can be multiple management workstations, and these can serve purposes other than managing server environment 10. In yet other embodiments, the management workstation is itself a part of the server environment and can be contained within a server partition.

A server administration program 23 is stored on hard disk 19. Portions of this program 23 are stored in memory 15 and are executed by processor 13 as needed. Program 23 provides an interactive graphical interface for managing server environment 10. Program 23 includes a server configuration control module 27 and a model generator 25. Configuration control module 27 provides for configuring servers S1 and S2 so as to define partitions, clusters, etc., and thus define a hierarchical arrangement of servers and partitions. Model generator 25 generates and displays an interactive image with graphics objects corresponding to servers S1 and S2 and their partitions.

In a cluster view, shown in FIG. 1, server environment 10 is represented by a server environment image 10$i$. In image 10$i$, image objects C1$i$, C2$i$, and C3$i$ respectively represent clusters C1, C2, and C3, image objects S1$i$ and S2$i$ respectively represent servers S1 and S2, and image objects P1$i$-P8$i$ respectively represent partitions P1-P8. Note that the graphical (image) objects shown on display 21 are arranged hierarchically in a manner analogous to the hierarchical arrangement of the servers and the partitions in the real server environment.

These listed graphics objects are arranged hierarchically, in that server image objects S1$i$ and S2$i$ are within the area defined by server environment image object 10$i$, and partition objects P1$i$-P8$i$ are respectively within areas defined by the server objects S1$i$ and S2$i$ that respectively correspond to the servers that contain the respectively represented partitions P1-P8. In other embodiments, the hierarchical arrangements are represented in other ways; for example, in one embodiment the hierarchical arrangements are represented as a descendent tree.

Since objects are represented in a hierarchical manner as shown in FIG. 1, it is easy to determine for each partition, which server contains it. Thus, when configuring or reconfiguring clusters, it is easy to ensure that the partitions of a cluster belong to different servers without referring to external programs or devices to relate servers and clusters. Conversely, model generator 25 makes it easy to determine which partitions belong to a cluster. For example, when an administrator selects a cluster, e.g., by clicking on the respective cluster image object, that image object and the partition objects representing partitions included within the cluster are commonly highlighted.

For example, when cluster C2 is selected, as indicated by the cursor image 29 in FIG. 1, the border of cluster image object C2$i$ is bolded and marqueed in that a white dashed pattern moves through the bold black border. Similarly, the borders for partition objects P3$i$ and P6$i$ are bolded and partitioned. Two objectives are achieved: one, the highlighted objects are emphasized, and, two, the highlighted objects are visually associated with each other.

In other embodiments, relative highlighting is achieved in other ways. For example, highlighting can be obtained by color selection, increasing color intensity, increasing contrast, adding motion, bolding alphanumerics, and varying other parameters, as known in graphic design arts. In still further embodiments, relative highlighting is achieved by changing the non-included image objects, which can be dimmed, minimized, removed, or removed and replaced by placeholders.

From the cluster view, clicking on a partition image object brings up an in-place menu that allows a partition to be added or removed from the cluster or allows parameters associated with a partition in the cluster to be edited. Editing cluster data in the context of the hierarchical image helps coordinate the different technologies associated with server environment 10.

Model generator 25 assembles server environment image 10$i$ from information obtained from partitions P1-P8 in response to Internet protocol (IP) inquires by configuration controller to IP addresses assigned to server environment 10. Each partition P1-P8 runs a respective instance of an operating system, and each instance has a respective IP address. When a partition's operating system receives the inquiry addressed to it, it responds by indicating the server within which it resides and any clusters it belongs to. In addition, it can describe the partition in terms of the number of cells, the nature of the cells, including processors used, memory characteristics, and I/O services. The operating system can identify itself, as well as resident software applications and their status as active or inactive, and resident processes. When a user implements a configuration change (e.g., a repartitioning or a cluster reassignment), using the graphical interface, configuration controller 27 transmits the corresponding commands to the target servers and partitions.

Figure 2:
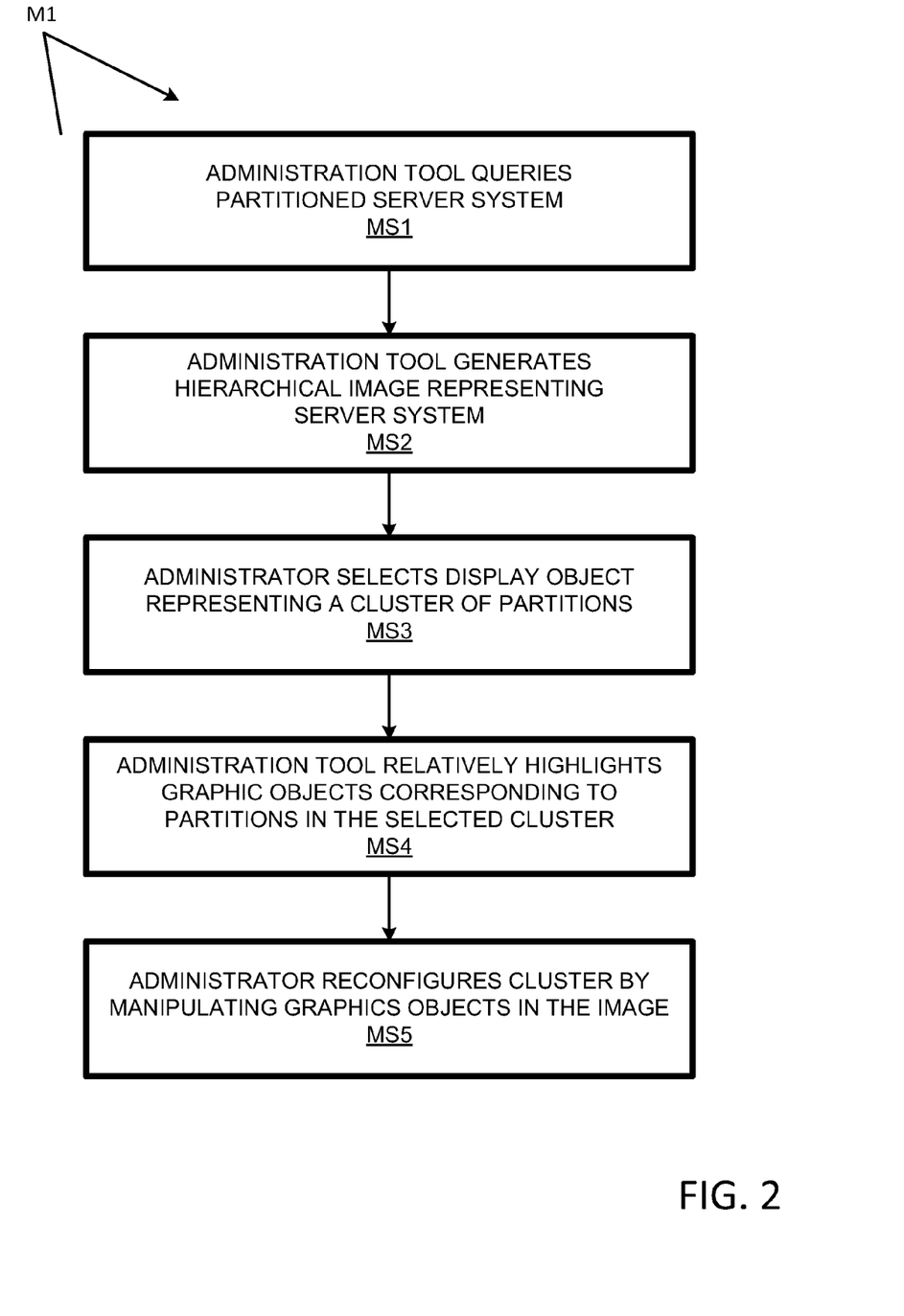
FIG. 2 is a flow chart of one of many possible methods that can be practiced in accordance with the present invention.

A method of the invention is flow charted in FIG. 2. At method segment MS1, management workstation 11 and configuration controller 27 query server environment 10. The query uses the Internet Protocol (IP) and addresses queries to a range of IP addresses assigned to server environment 10. Each partition has an operating system with at least one IP address and responds to the inquiry directed to it with information regarding the incorporating server, any incorporating cluster, the hardware constituting the partition, the natures of the operating system and other software available to run on the operating system.

At method segment MS2, management workstation 11 and model generator 25 generate and display an image representing server environment 10. Graphics objects representing partitions are arranged in a hierarchical relationship with respect to graphics objects representing the servers they belong to. For example, the partition objects can be shown within or as descendant branches from the incorporating servers.

At method segment MS3, an administrator (e.g., an IT professional) selects a cluster of partitions by graphically selecting a display (graphics, icon, or text) object. The selection can be by pointing and clicking on a display object, e.g., using a mouse, trackball, or operating a touch-sensitive display.

At method segment MS4, workstation 11 and model generator 25 relatively highlight partitions in the selected cluster. The graphics objects representing partitions included in a cluster can be commonly highlighted in any manner known in the graphic arts, including increasing intensity, contrast, saturation of colors, thickening lines and bolding text, adding dynamic elements, etc. Instead of or in addition, relative highlighting can be achieved by reducing graphic emphasis on non-included partitions. For example, graphics objects representing non-included partitions can be removed or replaced by indicators, minimized, dimmed, etc.

At method segment MS5, the administrator can reconfigure a cluster by manipulating graphics objects. For example, an administrator can select an included partition and call up an in-context drop-down menu, and select "remove from cluster" or "reconfigure cluster" from the menu. Alternatively, an administrator can select a non-included partition and select "include in cluster" from a drop-down menu.

Figure 3:
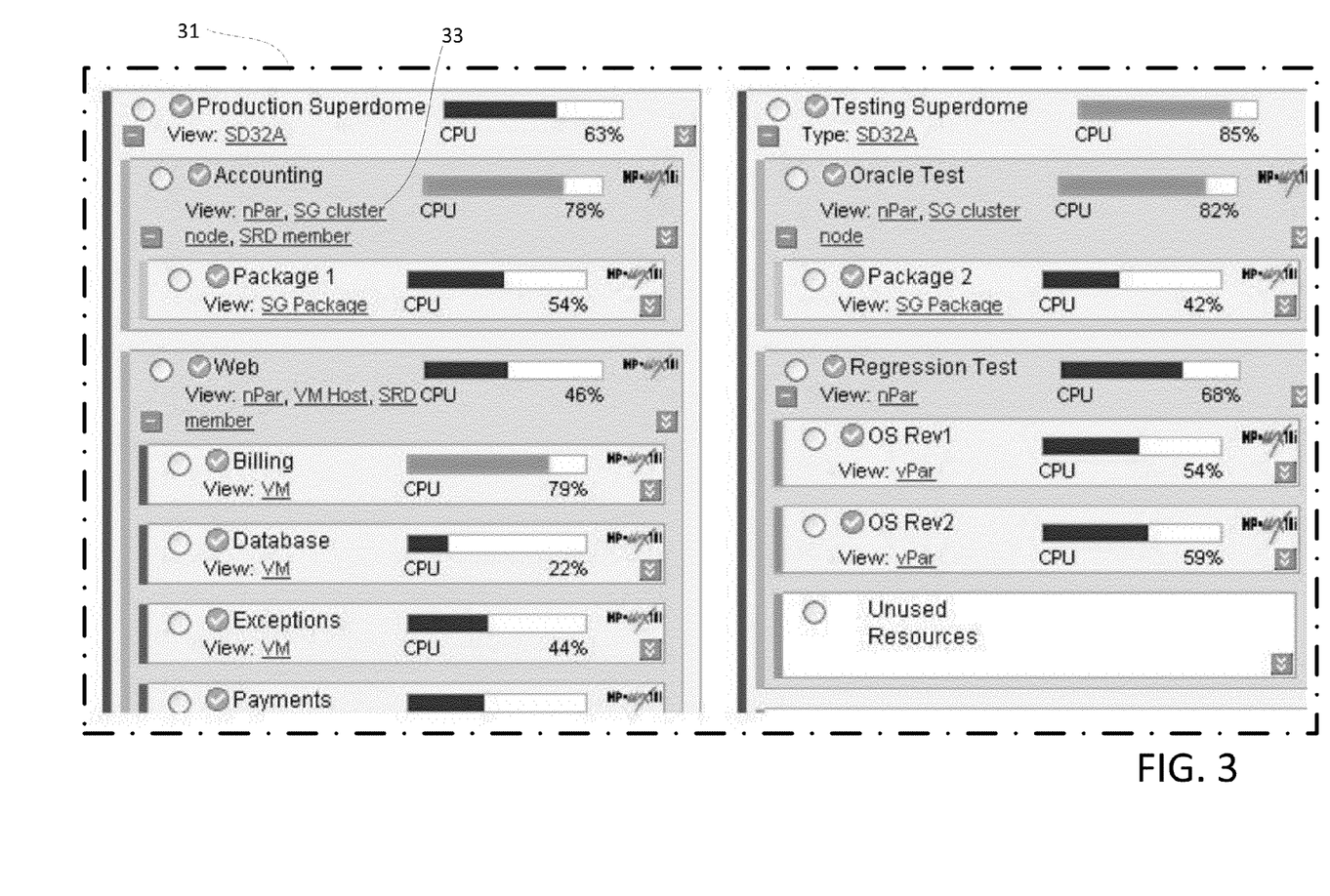
FIG. 3 is a grayscale image of part of a color screen shot produced by one of many possible embodiments of the invention.

FIG. 3 is a portion of a screen shot of a server environment image 31 for another embodiment of the invention. Image 31 includes two large rectangles, one labeled "Production Superdome" and the other labeled "Testing Superdome". "Superdome" is a trademark for servers available from Hewlett-Packard Company, and most of the text in FIG. 3 refers to trademarks and other labels used by Hewlett-Packard Company.

Within the "Production Superdome" rectangle are two rectangles corresponding to hard partitions, namely an "Accounting" partition and a "Web" partition. Likewise, within the "Testing Superdome" rectangle are "Oracle Test" ("Oracle" is a trademark of Oracle Corporation) and "Regression Test" hard partitions. In image 31, hard partitions are referred to as "nPars".

One or more descendant rectangular image objects reside within each partition rectangle. For example, the "Regression Test" hard partition includes image objects corresponding to an "OS Rev1" virtual partition and an "OS Rev2" virtual partition. Also included is an "Unused Resources" rectangle that can represent server cells that are not assigned to any partition and are therefore idle (e.g., as stipulated by contract terms).

Within the "Web" hard partition are four rectangular image objects (three of which are shown completely and one of which is partially shown). These image objects represent virtual machines. A virtual machine is a software layer that allows an operating system, e.g., HP-UX ("HP-UX" is a Trademark of Hewlett-Packard Company), Linux, Microsoft Windows ("Microsoft" and "Windows" are trademarks of Microsoft Corporation), or OpenVMS to run in a virtualized environment that enables hardware to be shared. In this case, the virtual machines are labeled "Billing", "Database", "Exceptions", and "Payments".

The "Accounting" and "Oracle Test" partitions include descendant rectangles labeled "Package 1" and "Package 2". These are "Serviceguard" (labeled "SG" in FIG. 3) packages, which is software available from Hewlett-Packard Company used to provide for clustering. This clustering software allows cluster members to replicate their states to each other so when a partition fails, its "partner" can resume operation from the last saved state.

Hard partitions, virtual partitions, virtual machines, and clusters represent different "technologies" so that different tools are conventionally used to manage them. However, the tool that generated the image 31 integrates these tools so that the relationships between the technologies can be taken into account during configuration. Yet, image 31 clearly distinguishes the technologies graphically by applying colors as a function of technology to the left borders of rectangular image objects, as shown in FIG. 3. For example, the left borders of all partitions are the same color and different from the colors of the left borders for virtual partitions, virtual machines, and Serviceguard packages, etc.

For each hard partition, virtual partition, virtual machine, and Serviceguard node, image 31 includes a bar graph representing the current (or recent) central processor unit (CPU) utilization for that item as a percentage of capacity for the cells dedicated to that technology instance.

Each image rectangle includes a list of "Views" such as SD32A (Superdome server), nPar (hard partition), SG (Serviceguard) Cluster node, SRD (Shared Resource Domain) member, VM (Virtual Machine), and vPar (virtual partitions). Each of these "views" is underlined, indicating that it serves as a hyperlink. Activating one of these hyperlinks causes image 31 to update to emphasize the entity represented by the including rectangle from the point of view of the technology represented by the hyperlink.

Figure 4:
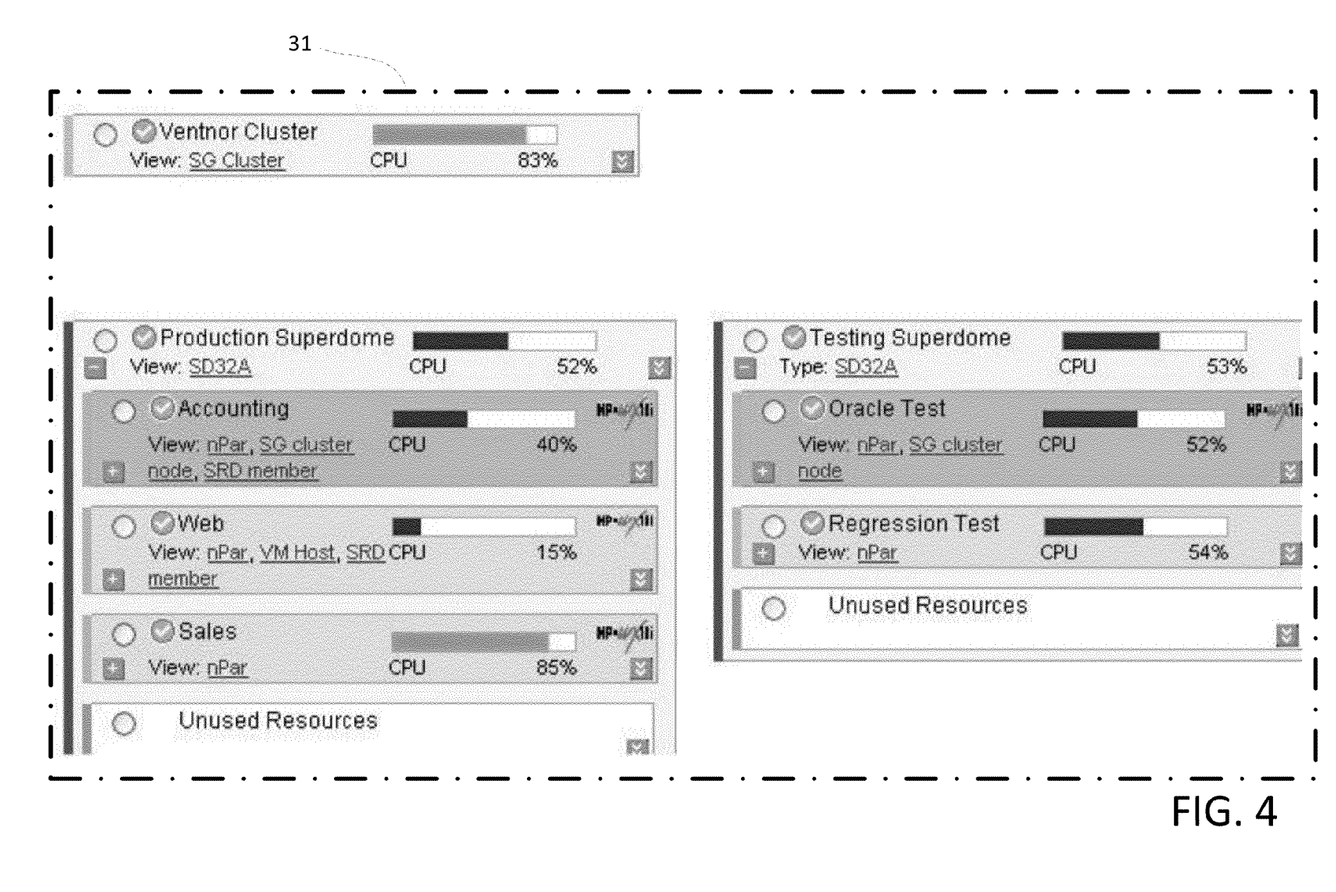
FIG. 4 is another grayscale image of a color screen shot provided by the embodiment referred to with respect to FIG. 3.

For example, activating the "SG cluster node" link in the "Accounting" partition image object updates image 31 to its form in FIG. 4. A new rectangle labeled "Ventnor Cluster" has been added to image 31. Also, the "Accounting" rectangle in which the "SG cluster node" link 33 was activated is now highlighted using an alternate color fill. One other rectangle is similarly colored and that is the "Oracle Test" rectangle. Visual inspection of FIG. 4 shows that it is easy to determine that the "Accounting" and "Oracle Test" partitions as belonging to the same cluster but different servers by examining the hierarchical aspects and highlighting applied to image 31 in FIG. 4.

Note that the hierarchy levels below that of hardware partition are hidden in FIG. 4 both for highlighted and non-highlighted partitions. In general, these lower levels are not needed for configuring clusters. However, it can be helpful to know what virtual partitions and virtual machines are running on a partition to determine which partitions require clustering. Activating a hyperlink with a square with a "+" sign in it expands the view to show the next hierarchy level down. When the next hierarchy level down is shown, the square is shown with a "−" in it. Activating the hyperlink with the "−" showing removes the descendant details from the image, as in a Windows (available from Microsoft Corporation) directory.

While the invention is particularly helpful when clusters of partitions in a multiple server environment, as generally defined it is not so limited. The graphic approach can be applied to any peer-to-peer relationship among represented hardware partitions, virtual partitions, and other server objects (e.g., virtual machines). Returning to FIG. 3, the "SRD member" views indicate that the "Accounting" and "Web" partitions both belong to shared-resource domains. Partitions belonging to the same shared-resource domain have a fixed total of resources that can be dynamically varied among members.

It cannot be determined from FIG. 3 whether they belong to the same or different shared resource domains. However, activating the "SRD member" link in the "Accounting" partition image object updates image 31. In the updated image, these two partitions would be commonly highlighted if they were part of the same shared-resource domain. If the "Web" partition image object were not highlighted, it would be part of a different shared resource domain. Note that this is an example of how the invention can be applied to peer-to-peer relationship between two partitions of the same server.

Figure 5:
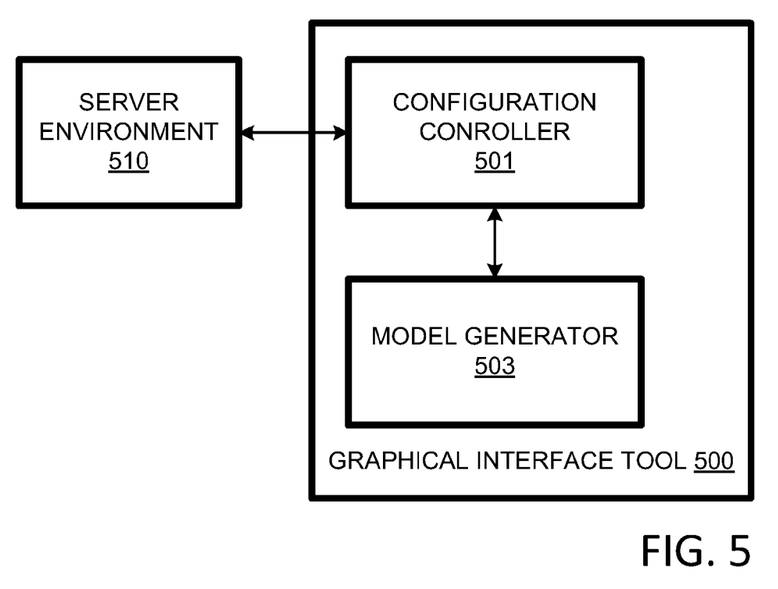
FIG. 5 is a schematic diagram of a graphical interface tool.
Figure 6:
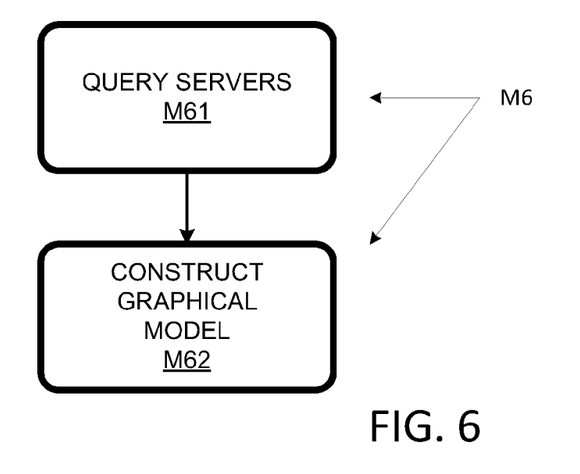
FIG. 6 is a flow chart of one of many possible methods that can be practiced in accordance with the present invention.

A graphical interface tool 500 in accordance with a second embodiment of the invention is shown in FIG. 5 having a configuration controller 501 and a model generator 503. Configuration controller 501 interfaces model generator 503 with a server environment 510. A method M6 in accordance with an embodiment of the invention is flow charted in FIG. 6. In a method segment M61, servers are queried regarding their configurations. At method segment M62, the responses to the queries are used to generate a graphical model of the servers.

Herein, a "server" is a computer that provides services to other computers. This includes dedicated servers as well as networked workstations that provide limited services to other computers. A "server environment" is a system of computers that collectively provide services to other computers. A server environment can include "back-end" computers that provide services to servers, e.g., database services to a web server.

Herein, a "hard partition" is a physically configured portion of a server including one or more processors that can be reconfigured without halting operation of other partitions of the same server. A "virtual partition" is a software configured portion of a hardware partition that can run an independent instance of an operating system on at least one dedicated processor. A "virtual machine" is a software layer than runs on top of an operating system and mimics native hardware to an operating system running on it.

A "resource partition" is a portion of a hardware partition within a single operating system instance (e.g., in terms of CPU, memory, I/O and other possible resources), a virtual partition, or a virtual machine; it need not command an entire processor. Herein, an unqualified "partition" can be a hard partition or a virtual partition but not a resource partition.

"Highlighting" as used herein encompasses any method of graphically emphasizing a graphic object. This can include increasing intensity, saturation, darkness, contrast, movement, bolding, underlining, italicizing, enlarging, etc. It is not possible to make a comprehensive list, but the effects are readily apparent. "Relative highlighting" encompasses the techniques above plus techniques to reduce emphasis objects that are not of interest. Relatively highlighting can include dimming, removing, and replacing, and shrinking objects other than those to be emphasized. "Common highlighting" involves applying the same highlighting technique to multiple objects; for example, the same bright color can be applied to several objects in a group. Common highlighting can be used to emphasize the relatedness of the real objects represented by the highlighted graphic objects.

An "operating system" is a program for managing a computer and for running third-party application software for that system. Operating systems allow communication between applications, as well as between pieces of hardware (the motherboard, graphics card, printer, et cetera). The common understanding of the term "operating system," by both popular and professional sources, includes the low-level "kernel" that interacts directly with the hardware as well as libraries used by applications and basic programs for manipulating files and configuring the system. (Herein, several definitions have been taken from or adapted from the Wikipedia, a free encyclopedia on the World Wide Web at www-dot-Wikipedia-dot-org.) Each hardware and virtual partition has its own operating system. Two partitions can run (concurrently) different instances of the same operating system. Also, two partitions can run different versions or revisions of the same operating system.

A "sibling" group of partitions is a group in which all member partitions belong to the same ancestor, e.g., a group of hardware partitions belonging to the same server, or a group of virtual partitions belonging to the same hardware partition. An "incomplete sibling group" contains some but not all descendants of an immediate ancestor, as in two hard partitions of a server having three or more partitions. A "non-sibling" group contains a pair of partitions that are not descendants of the same ancestor, as in hard partitions of different servers; a "non-sibling" group may include other partitions that are siblings.

Herein, a "cluster" is a group of hardware partitions communicatively coupled, e.g., networked, so as to perform a task collectively. In the foregoing description, the emphasis has been on "high-availability" clusters. "High-availability clusters are implemented primarily for the purpose of improving the availability of services which the cluster provides. They operate by having redundant nodes, which are then used to provide service when system components fail. The most common size for a high-availability cluster is two nodes to provide redundancy. High-availability cluster implementations attempt to manage the redundancy inherent in a cluster to eliminate single points of failure. There are many commercial implementations of high-availability clusters for many operating systems.

However, other types of clusters are provided for, including load-balancing clusters and high-performance clusters. "Load-balancing clusters operate by having all workload come through one or more load-balancing front ends, which then distribute it to a collection of back end servers. Although they are implemented primarily for improved performance, they commonly include high-availability features as well. Such a cluster of computers is sometimes referred to as a server farm. High-performance clusters are implemented primarily to provide increased performance by splitting a computational task across many different nodes in the cluster, and are most commonly used in scientific computing.

The present invention provides a significant advance in handling increasing complex server environments. More generally, the invention can be applied to any number of servers in any geographical arrangement. It can be applied to servers with one or more hard partitions. Each hard partition can be divided among plural virtual partitions, virtual machines, and shared resource domains. (Virtual partitions run their own instances of operating systems on dedicated sets of hardware resources and can be shutdown or rebooted independently of the other Virtual partitions.) Each of these can be further divided into resource partitions; resource partitions share the resources of a virtual partition and even of cells.

To the extent that a server hierarchy is present, it can be represented graphically so that the different levels and technologies can be dealt with in context. Using relative highlighting, various peer-to-peer relationships can be visually emphasized. The peer relationships can be among elements at various levels of the hierarchy, including hard partitions, virtual partitions and other technologies on that level, and resource partitions. A wide variety of graphics techniques are known for emphasizing and associating spaced graphics elements corresponding to peer-to-peer relationships.

Herein, related art is disclosed below to aid in understanding the present invention. Related art labeled "prior art" is admitted prior art, while related art not labeled "prior art" is not admitted prior art. In addition to the illustrated embodiments, other variations upon and modification to the described invention are provided for by the present invention, the scope of which is defined in the following claims.

What is claimed is:

1. A system comprising:
a server environment including plural hardware servers, at least a first server of said servers including a hierarchy of partitions of said first server; and
a management station having an administrative interface including a display to display alternate views of a graphical representation of said server environment, each of said views having graphical partition elements corresponding to at least some of said partitions nested within graphical server elements in that each nesting graphical server element has a border enclosing a respective nested graphical partition element, at least one of said views having first and second graphical partition elements nested within a third graphical partition element in that said third graphical server element has a border enclosing said first and second graphical partition elements, said graphical server elements corresponding to at least some of said hardware servers, at least some of said graphical partition elements containing links that when activated cause said graphical representation to switch to another of its views in which is highlighted a graphical partition element that was not highlighted in the previous view.

2. A system as recited in claim 1 wherein said administrative interface provides that, in a view resulting from activation of one of said links, graphical partition elements corresponding to a group of said partitions are highlighted relative to graphical partition elements of other partitions represented in the resulting view, that group including the graphical partition element in which the link was located and at least one other graphical partition element.

3. A system as recited in claim 2 wherein said group corresponds to a high-availability cluster including partitions of different hardware servers.

4. A system as recited in claim 2 wherein said group corresponds to a resource domain of partitions among which resources can be reallocated, said resource domain including a partition and one or more but not all of its siblings.

5. A computer-implemented method comprising:
a computer displaying on a display a first view of a graphical representation of a server environment, said graphical representation including graphical server elements corresponding to hardware servers of said server environment, said graphical representation including graphical partition elements nested within said graphical server elements in that each nesting graphical server element has a border enclosing a respective nested graphical partition element, said graphical partition elements corresponding to partitions of said hardware servers, said graphical partition elements including first, second, and third graphical partition elements, said first and second graphical partition elements being nested within said third graphical partition element in that said third graphical server element has a border enclosing said first and second graphical partition elements; and
in response to an activation of a link contained within one of said graphical partition elements, said computer physically transforming said display so as to change said graphical representation to a second view in which at least one graphical partition element, other than the graphical partition element including said link, that was not highlighted in said first view is highlighted in said second view.

6. A method as recited in claim 5 wherein, in response to said activation, a group of graphical partition elements is activated, that group including the graphical partition element in which the link was located and at least one other graphical partition element.

7. A method as recited in claim 5 wherein said group corresponds to a resource domain of partitions among which resources can be reallocated, said resource domain including a partition and one or more but not all of its siblings.

8. A method as recited in claim 6 wherein said group corresponds to a high-availability cluster including partitions of different hardware servers.

9. A method as recited in claim 8 further comprising said computer reconfiguring said cluster in response to an administrator manipulating said graphical partition elements.

10. A computer product comprising non-transitory tangible computer-readable storage media encoded with code to, when executed by a processor,
display a first view of a graphical representation of a server environment, said graphical representation including graphical server elements corresponding to hardware servers of said server environment, said graphical representation including graphical partition elements nested within said graphical server elements in that each nesting graphical server element has a border enclosing a respective nested graphical partition element, said graphical partition elements corresponding to partitions of said hardware servers, said graphical partition elements including first, second, and third graphical partition elements, said first and second graphical partition elements being nested within said third graphical partition element in that said third graphical server element has a border enclosing said first and second graphical partition elements; and
in response to an activation of a link contained within one of said graphical partition elements, said computer physically transforming said display so as to change said graphical representation to a second view in which at least one graphical partition element, other than the graphical partition element including said link, that was not highlighted in said first view is highlighted in said second view.

11. A computer product as recited in claim 10 wherein, in response to said activation, a group of graphical partition elements is activated, that group including the graphical partition element in which the link was located and at least one other graphical partition element.

12. A computer product as recited in claim 11 wherein said group corresponds to a resource domain of partitions among which resources can be reallocated, said resource domain including a partition and one or more but not all of its siblings.

13. A computer product as recited in claim 11 wherein said group corresponds to a high-availability cluster including partitions of different hardware servers.

14. A computer product as recited in claim 13 wherein said code is further configured to reconfigure said cluster in response to an administrator manipulating said graphical partition elements.

* * * * *

UNITED STATES PATENT AND TRADEMARK OFFICE
CERTIFICATE OF CORRECTION

| | | |
|---|---|---|
| PATENT NO. | : 8,745,503 B2 | Page 1 of 1 |
| APPLICATION NO. | : 12/906090 | |
| DATED | : June 3, 2014 | |
| INVENTOR(S) | : Bryan J. Jaquot et al. | |

It is certified that error appears in the above-identified patent and that said Letters Patent is hereby corrected as shown below:

In the Specification:

In column 5, line 59, after "link" insert -- 33 --.

Signed and Sealed this
Fourteenth Day of October, 2014

Michelle K. Lee
*Deputy Director of the United States Patent and Trademark Office*